United States Patent
Muppalaneni et al.

(10) Patent No.: US 9,977,746 B2
(45) Date of Patent: May 22, 2018

(54) PROCESSING OF INCOMING BLOCKS IN DEDUPLICATING STORAGE SYSTEM

(71) Applicant: HEWLETT PACKARD ENTERPRISE DEVELOPMENT LP, Houston, TX (US)

(72) Inventors: Nitin Muppalaneni, Los Altos, CA (US); Umesh Maheshwari, San Jose, CA (US); Steve Rodrigues, Mountain View, CA (US); Srikant Varadan, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 72 days.

(21) Appl. No.: 14/919,414

(22) Filed: Oct. 21, 2015

(65) Prior Publication Data

US 2017/0115883 A1  Apr. 27, 2017

(51) Int. Cl.
*G06F 3/06* (2006.01)
*G06F 12/1009* (2016.01)

(52) U.S. Cl.
CPC ........ *G06F 12/1009* (2013.01); *G06F 3/0641* (2013.01); *G06F 2212/65* (2013.01)

(58) Field of Classification Search
CPC ...... G06F 3/0641; G06F 3/0608; G06F 3/061; G06F 3/0679; G06F 3/0671;
(Continued)

(56) References Cited

U.S. PATENT DOCUMENTS

| 9,424,285 B1* | 8/2016 | Condict ............... G06F 3/06 |
| 2007/0208918 A1* | 9/2007 | Harbin ............ G06F 11/1451 711/162 |

(Continued)

FOREIGN PATENT DOCUMENTS

| WO | WO-2015167493 | 11/2015 |
| WO | WO-2016048331 | 3/2016 |

(Continued)

OTHER PUBLICATIONS

Permabit Technology Corporation, "Data Deduplication 2.0: Powered by AlbireoTM High Performance Data Optimization Software," OEM Data Optimization, Nov. 22, 2010; pp. 1-3.
(Continued)

*Primary Examiner* — Hashem Farrokh

(57) ABSTRACT

Methods, systems, and computer programs are presented for deduplicating data. One method includes an operation for receiving a data block having a logical address. The storage system includes a logical address mapping index for mapping logical addresses to block numbers, a block index for mapping block numbers to physical locations, and a fingerprint index for mapping fingerprints of data blocks to block numbers. Additionally, the method includes an operation for inline processing the data block. Inline processing the data block includes determining a fingerprint of the data block, examining the fingerprint index to determine if the fingerprint is already mapped to an existing data block in the storage system, if the fingerprint is already mapped then adding a mapping of the logical address to the existing data block in the logical address mapping index, and if the fingerprint is not already mapped then creating the corresponding entries in the indices.

20 Claims, 12 Drawing Sheets

(58) Field of Classification Search
CPC ........... G06F 17/30306; G06F 17/3033; G06F 3/0616; G06F 3/0652; G06F 12/1009; G06F 2212/65; G06F 2212/7205
See application file for complete search history.

(56) References Cited

U.S. PATENT DOCUMENTS

| | | | | |
|---|---|---|---|---|
| 2011/0208979 | A1* | 8/2011 | Saarinehn | G06F 15/167 713/193 |
| 2016/0026653 | A1* | 1/2016 | Caro | G06F 17/30159 707/692 |
| 2016/0139817 | A1* | 5/2016 | Harijono | G06F 3/0608 711/154 |

FOREIGN PATENT DOCUMENTS

| WO | WO-2016068877 | 5/2016 |
|---|---|---|
| WO | WO-2017019079 | 2/2017 |

OTHER PUBLICATIONS

Permabit Technology Corportation, "Permabit Albireo Data Optimization Software," Aug. 2012, <http://datastorageasean.com/sites/default/files/Permabit-Albireo-VDO-wp.pdf>.

\* cited by examiner

Partial Post-Processing Deduplication

Inline

Calculate fingerprint but look up only cached fingerprint index (FI)

Calculate $FP_f$ of incoming data $LA_a$
Look up $FP_f$ in FI cache
If $(FP_f \rightarrow BN_b)$ in FI cache then
    add $LA_a \rightarrow BN_b$ in LI
    increase $BN_b.RC$ in BI
else
    add $PL_n$ for new data
    add $BN_m \rightarrow PL_n$ in BI
    add $LA_a \rightarrow BN_m$ in LI
    add $FP_f \rightarrow BN_m$ to FI cache

Post-Processing

Update inconsistent mappings between FI cache and full FI and reclaim memory

Apply updates in cached FI to full FI:
If (found $(FP_i \rightarrow BN_j)$ in full FI) and
found $(FP_i \rightarrow BN_k)$ in FI cache) then
    replace $FP_i$ mapping in FI cache to $(FP_i \rightarrow BN_j)$
    $BN_j.RC = BN_j.RC + BN_k.RC$ {update count in BI}
    Replace LA pointers to $BN_k$ to point to $BN_j$ in LI
    Garbage collect $BN_k$ and corresponding $PL_n$

Fig. 5

PROCESSING OF INCOMING BLOCKS IN DEDUPLICATING STORAGE SYSTEM

BACKGROUND

1. Field of the Invention

The present embodiments relates to methods, systems, and programs for storing data, and more particularly, methods, systems, and computer programs for storing data in a networked storage system.

2. Description of the Related Art

Network storage, also referred to as network storage systems or storage systems, is computer data storage connected to a computer network providing data access to heterogeneous clients. Typically network storage systems process a large amount of Input/Output (IO) requests, and high availability, speed, and reliability are desirable characteristics of network storage.

Some storage systems store data that may be repeated multiple times. For example, a storage system may provide backup for many desktop clients, and many of the clients may be running the same operating system, which causes the storage system to keep multiple copies of the same software.

Some storage systems analyze the data stored and aim at minimizing redundancy by keeping only one copy of data that has been stored multiple times, in a process that is often referred to us deduplication, or dedup for short. However, deduplicating data may be an expensive operation in terms of resource utilization, as deduplication requires analyzing the data to identify repetitions.

What is needed is a storage system that performs deduplication with minimal impact on the performance the system.

It is in this context that embodiments arise.

SUMMARY

Methods, devices, systems, and computer programs are presented for managing a storage system. It should be appreciated that the present embodiments can be implemented in numerous ways, such as a method, an apparatus, a system, a device, or a computer program on a computer readable medium. Several embodiments are described below.

In one embodiment, a method is provided. The method includes an operation for receiving, at a storage system, a data block having a logical address. The storage system includes a logical address mapping index for mapping logical addresses to block numbers, a block index for mapping block numbers to physical locations, and a fingerprint index for mapping fingerprints of data blocks to block numbers. Additionally, the method includes an operation for inline processing the data block. Inline processing the data block includes determining a fingerprint of the data block, examining the fingerprint index to determine if the fingerprint is already mapped to an existing data block in the storage system, if the fingerprint is already mapped then adding a mapping of the logical address to the existing data block in the logical address mapping index, and if the fingerprint is not already mapped then: storing the data block in the storage system, adding a mapping of the logical address to the data block in the logical address mapping index, adding a mapping of the data block to the physical location in the block index, and adding a mapping of the fingerprint to the data block in the fingerprint index.

In another embodiment, a storage system is presented. The storage system includes permanent storage, a memory, and a processor. The memory is for storing a logical address mapping index for mapping logical addresses to block numbers, a block index for mapping block numbers to physical locations, and a fingerprint index for mapping fingerprints of data blocks to block numbers. The processor is operable to receive a data block having a logical address, and the processor performs inline processing of the data block. The inline processing includes determining a fingerprint of the data block, examining the fingerprint index to determine if the fingerprint is already mapped to an existing data block in permanent storage, if the fingerprint is already mapped then adding a mapping of the logical address to the existing data block in the logical address mapping index, and if the fingerprint is not already mapped then: storing the data block in the permanent storage, adding a mapping of the logical address to the data block in the logical address mapping index, adding a mapping of the data block to the physical location in the block index, and adding a mapping of the fingerprint to the data block in the fingerprint index.

In yet another embodiment, a non-transitory computer-readable storage medium storing a computer program is presented. The computer-readable storage medium includes program instructions for receiving, at a storage system, a data block having a logical address. The storage system includes a logical address mapping index for mapping logical addresses to block numbers, a block index for mapping block numbers to physical locations, and a fingerprint index for mapping fingerprints of data blocks to block numbers. The storage system further includes program instructions for inline processing the data block. Inline processing the data block includes determining a fingerprint of the data block, examining the fingerprint index to determine if the fingerprint is already mapped to an existing data block in the storage system, if the fingerprint is already mapped then adding a mapping of the logical address to the existing data block in the logical address mapping index, and if the fingerprint is not already mapped then: storing the data block in the storage system, adding a mapping of the logical address to the data block in the logical address mapping index, adding a mapping of the data block to the physical location in the block index, and adding a mapping of the fingerprint to the data block in the fingerprint index.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIG. 5 illustrates a partial post-processing deduplication method, according to one embodiment.

DETAILED DESCRIPTION

The following embodiments describe methods, devices, systems, and computer programs for deduplicating data in a network storage device. It will be apparent, that the present embodiments may be practiced without some or all of these specific details. In other instances, well-known process operations have not been described in detail in order not to unnecessarily obscure the present embodiments.

Figure 1:
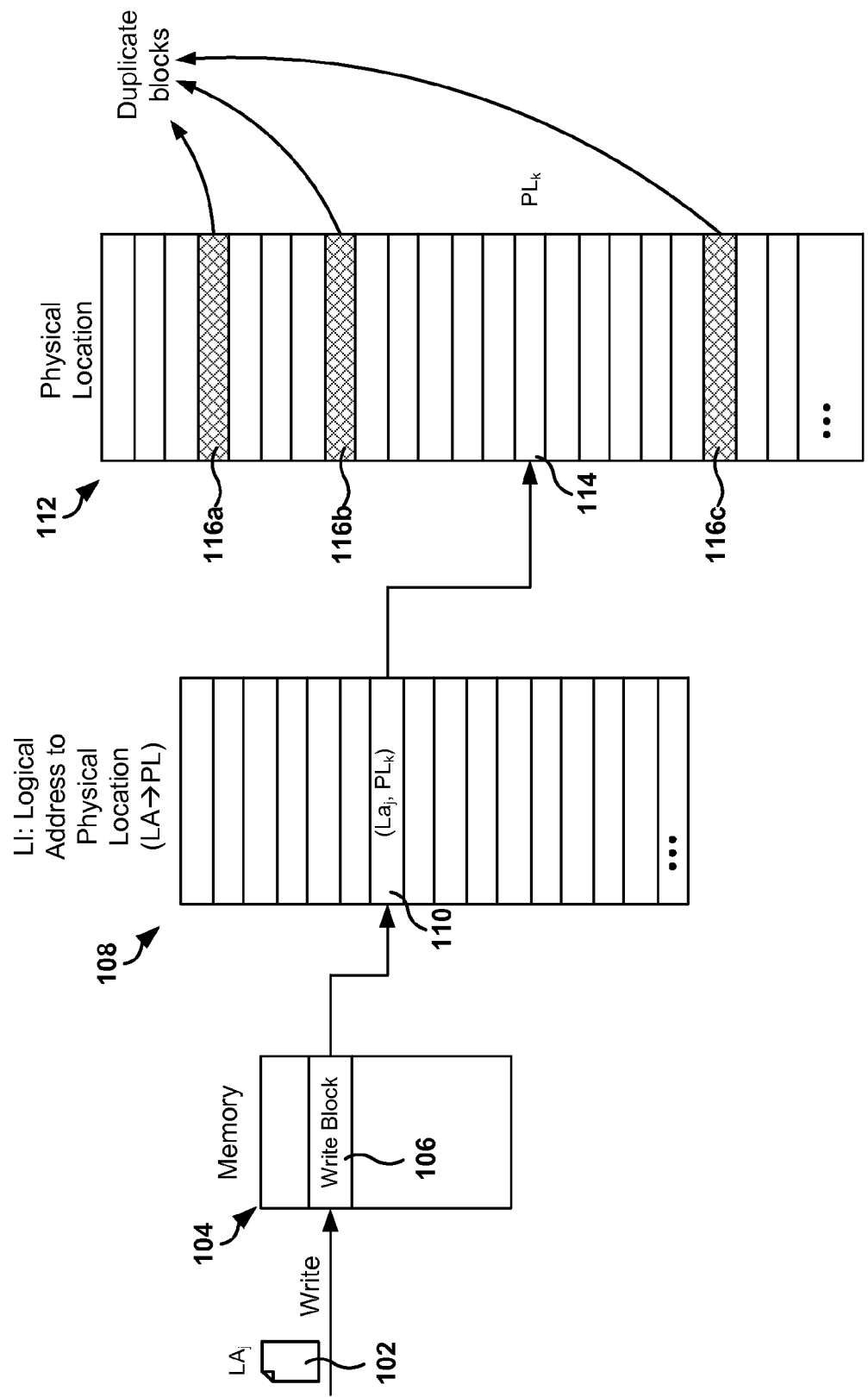
FIG. 1 illustrates a write operation in a storage system, according to one embodiment.

FIG. 1 illustrates a write operation in a storage system, according to one embodiment. An incoming write request 102, having a logical address (LA) $LA_j$ is received by the storage system and the data stored 106 in memory 104. The unit of storage is referred to herein as a block, and in some embodiments, all blocks will have the same size, but in other embodiments, blocks may have different sizes.

For simplicity of description, embodiments presented herein will be described with reference to operations performed on a single block, but the same principles may be applied for write operations that include multiple blocks. For example, an incoming write request may have a size of 5, 10, or 15 blocks, although other values are also possible.

In one embodiment, the storage system includes a logical address index (LI) that maps logical addresses to physical locations (PL), the physical locations referring to the actual storage location in the physical storage device. To complete the write operation, the incoming block 106 is transferred to a physical location (PL) 114, and a mapping 110 is created in LI between the logical address $LA_j$ of the block and the physical location where the block is stored $PL_k$.

As used herein, mappings in an index, such as LI, that map one address to another are represented as a pair of values enclosed in parentheses and separated by a comma. For example, mapping 110 described above is represented as $(LA_j, PL_k)$. This mean that within index LI, there is a pointer to physical location $PL_k$, for address $LA_j$.

The mappings may be unidirectional, which mean that there is a pointer from one address to another, or the mappings may be bi-directional, which means that there can be pointers going in either direction, from one address to the other, or vice versa. Further, the index may be traversed by the first address of the pair, or by the second address of the pair, or by both addresses. For example, LI may be indexed by logical address to find out the physical location associated with a logical address, or vice versa.

In the exemplary embodiment of FIG. 1, three blocks 116a, 116b, and 116c in PL 112 contain the same data, meaning that the blocks are duplicates of each other. The goal of a deduplicating process is to store only one of the duplicated blocks to utilize less physical storage.

Figure 2A:
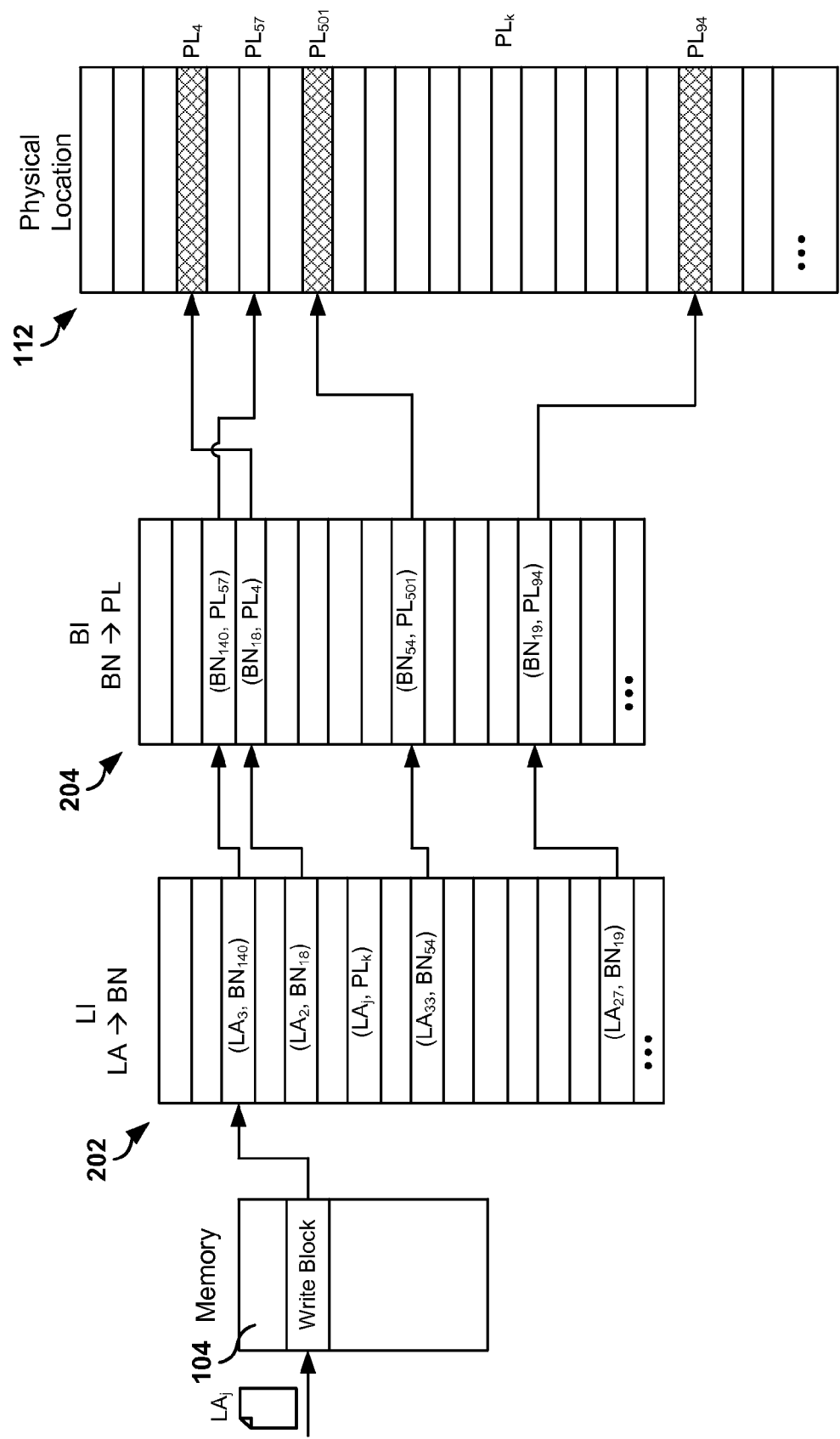
FIG. 2A illustrates a storage system with duplicated data blocks, according to one embodiment.

FIG. 2A illustrates a storage system with duplicated data blocks, according to one embodiment. In the embodiment of FIG. 2A, a new index, named block index (BI), is presented, where BI introduces a level of indirection for mapping logical addresses to physical locations. The storage system assigns block numbers to the blocks being stored, and BI maps block numbers to physical locations (BN, PL).

LI includes mappings of logical address to block number (LA, BN). In another embodiment, the LI may also include mappings of logical addresses to physical locations (LA, PL). In some embodiments, a logical address may be mapped to both a block number and a physical location.

Therefore, LI includes a mapping of a logical address to a block number (e.g., $(LA_3, BN_{140})$), and BI includes the mapping of the block number to the physical location (e.g., $(BN_{140}, PL_{57})$). As a result, the storage system identifies that a logical address is mapped to a physical location (e.g., $LA_3$ is mapped to $PL_{57}$ through $BN_{140}$).

It is noted that one or more logical addresses may be mapped to the same block number or to the same physical location. In the exemplary embodiment of FIG. 2A, three blocks contain the same data, and the three blocks are mapped to respective physical locations. Thus, $PL_4$, $PL_{501}$, and $PL_{94}$ are copies, and respective blocks $BN_{18}$, $BN_{54}$, and $BN_{19}$ refer to the same data, and the storage system includes the following mappings: $(LA_2, BN_{18})$, $(BN_{18}, PL_4)$, $(LA_{33}, BN_{54})$, $(BN_{54}, PL_{501})$, $(LA_{27}, BN_{19})$, and $(BN_{19}, PL_{94})$.

Other solutions create a fingerprint index (LA, FP), instead of the block index described in FIG. 2A. These solutions also include a mapping (FP, PL) from the fingerprint FP to the physical location PL. However, in these solutions the fingerprint is a critical part of the operation of the storage system, and each read or write operation requires knowledge, and sometimes calculation, of the fingerprint.

Figure 2B:
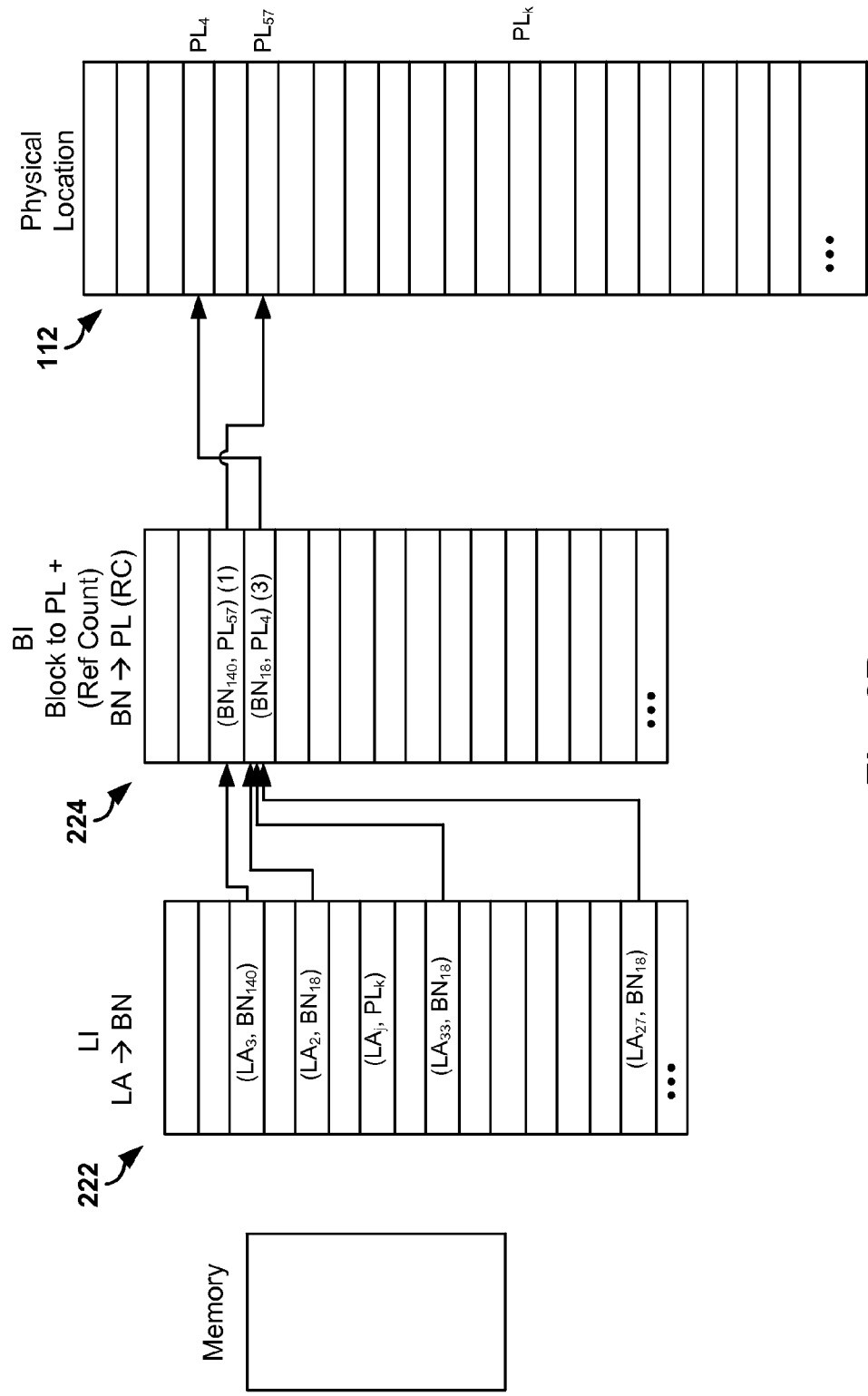
FIG. 2B illustrates a deduplication process, according to one embodiment.

FIG. 2B illustrates a deduplication process, according to one embodiment. Data deduplication, or simply called deduplication, is a data compression technique for eliminating duplicate copies of repeating data. Data deduplication inspects volumes of data and identifies sections—such as entire files or large sections of files—that are identical, and stores only one copy of the repeated data. For example, an email system may contain 100 instances of the same 1 MB file attachment. Each time the email platform is backed up, all 100 instances of the attachment are saved, requiring 100 MB of storage space. With perfect data deduplication, only one instance of the attachment is stored.

FIG. 2B shows the same storage system as in FIG. 2A after deduplication. Only one physical location $PL_4$ now stores the duplicated data, and the other physical locations $PL_{501}$ and $PL_{94}$ from FIG. 2A have been freed for reuse. Instead of having three different block entries in BI 224, only one entry is kept $(BN_{18}, PL_4)$ with a reference count (RC) of 3. In one embodiment, RC indicates how many logical addresses are associated with the same block number. LI 222 has also been modified so the logical addresses of the deduplicated data now point to the same BN in BI (e.g., $BN_{18}$).

In another embodiment, deduplication may be performed by keeping the three different block entries in BI, but they would all point to the same PL. In one embodiment, the data within the storage array is organized in volumes (e.g., a drive), where each volume is a single accessible storage area. The write request for block B, includes a volume identifier $V_j$ and an offset $A_k$ within the volume. In one embodiment, the logical address refers to a volume and the block and/or offset within the volume.

In one embodiment, deduplication may be performed over all the volumes currently being kept in the storage system, and in another embodiments, deduplication may be performed by volume, thus guaranteeing complete volume independence and data separation.

Some storage systems may do deduplication by volume, and deduplication may be turned on or off for each volume. If deduplication is turned off for a period of time, it is possible to turn deduplication on at a later point in time and deduplicate new incoming data, as well as the data already stored.

In one embodiment, the storage system may turn off deduplication automatically for periods of time based on performance criteria. For example, the system may turn off deduplication if the system becomes busy and performance (e.g., response time, throughput) degrades beyond a certain threshold. This way, the system becomes more responsive, and when traffic decreases, the system may turn on deduplication again.

Figure 3A:
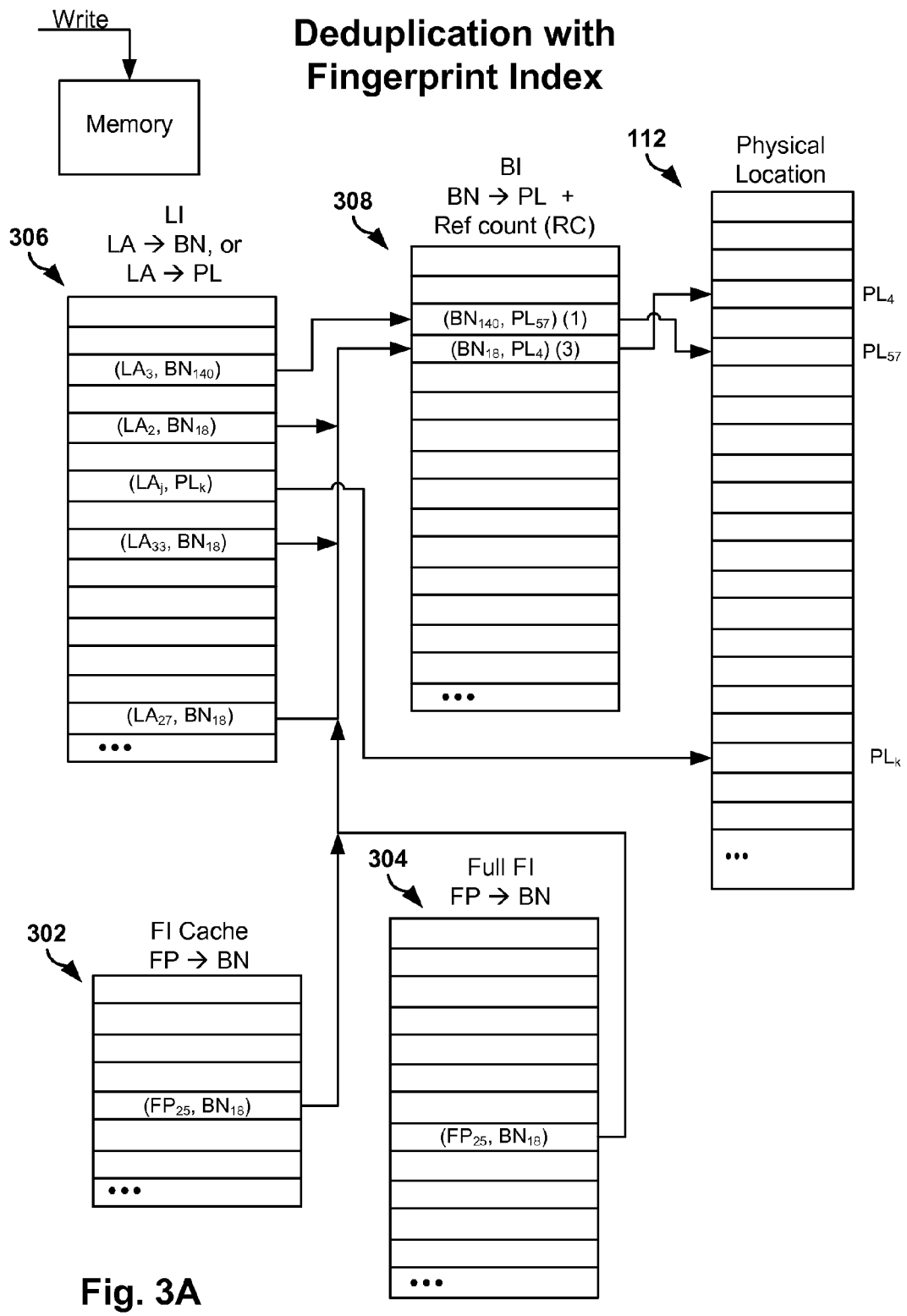
FIG. 3A illustrates the use of a fingerprint index for deduplication, according to one embodiment.

FIG. 3A illustrates the use of a fingerprint index for deduplication, according to one embodiment. In one embodiment, deduplication utilizes fingerprinting. A fingerprinting algorithm is a procedure that maps an arbitrarily large data item (such as a computer file) to a much shorter bit string, referred to as the fingerprint. Fingerprints are typically used to avoid the comparison and transmission of bulky data. For instance, a web browser or proxy server can efficiently check whether a remote file has been modified, by fetching only its fingerprint and comparing it with that of the previously fetched copy. In one embodiment, fingerprint functions operate as high-performance hash functions used to uniquely identify substantial blocks of data.

In the exemplary embodiment of FIG. 3A, a fingerprint index (FI) 304 maps fingerprints (FP) to block numbers (BN). In one embodiment, fingerprint index FI 304 is kept in permanent storage, and a cached subset of FI 302, referred to as FI cache or FI cached, is stored in another memory (e.g., RAM). In one embodiment, the fingerprints require much more storage space than a block number. For example, a fingerprint may be 32 bytes while a block number may be 8 bytes.

The full FI 304 may be large, and accessing this index may be costly, in terms of resources, when incoming data is being written to the storage system. Further, calculating fingerprints may also be costly in terms of performance when processing incoming data.

In one embodiment, the FI may be limited to a certain size, which means that not all fingerprints may be mapped in the FI. Further, if the FI gets lost or damaged, the FI may be re-created over time as new data comes in, or as deduplicating operations are being performed.

In one embodiment, when a block $BN_i$ is deduplicated, the fingerprint $FP_j$ of the block $BN_i$ is calculated (e.g., $FP_{25}$). Then, the FI index is checked, and if there is an entry already for fingerprint $FP_j$ for a block different from $BN_i$, then $BN_i$ is merged with the block mapped to $FP_j$ (e.g., $BN_{18}$). $BN_i$ is then freed for reuse. In addition, the reference count RC for the corresponding entry in BI is increased to reflect that there is one more block mapped to that block number.

In one embodiment, the FI cache 302 is checked first during deduplication, and if the fingerprint is not found in FI cache 302 then the full index FI is checked. If an entry is not found in the full FI index, then the block is a stored in PL, and new corresponding mappings are created in the FI, LI, and BI indexes.

Figure 3B:
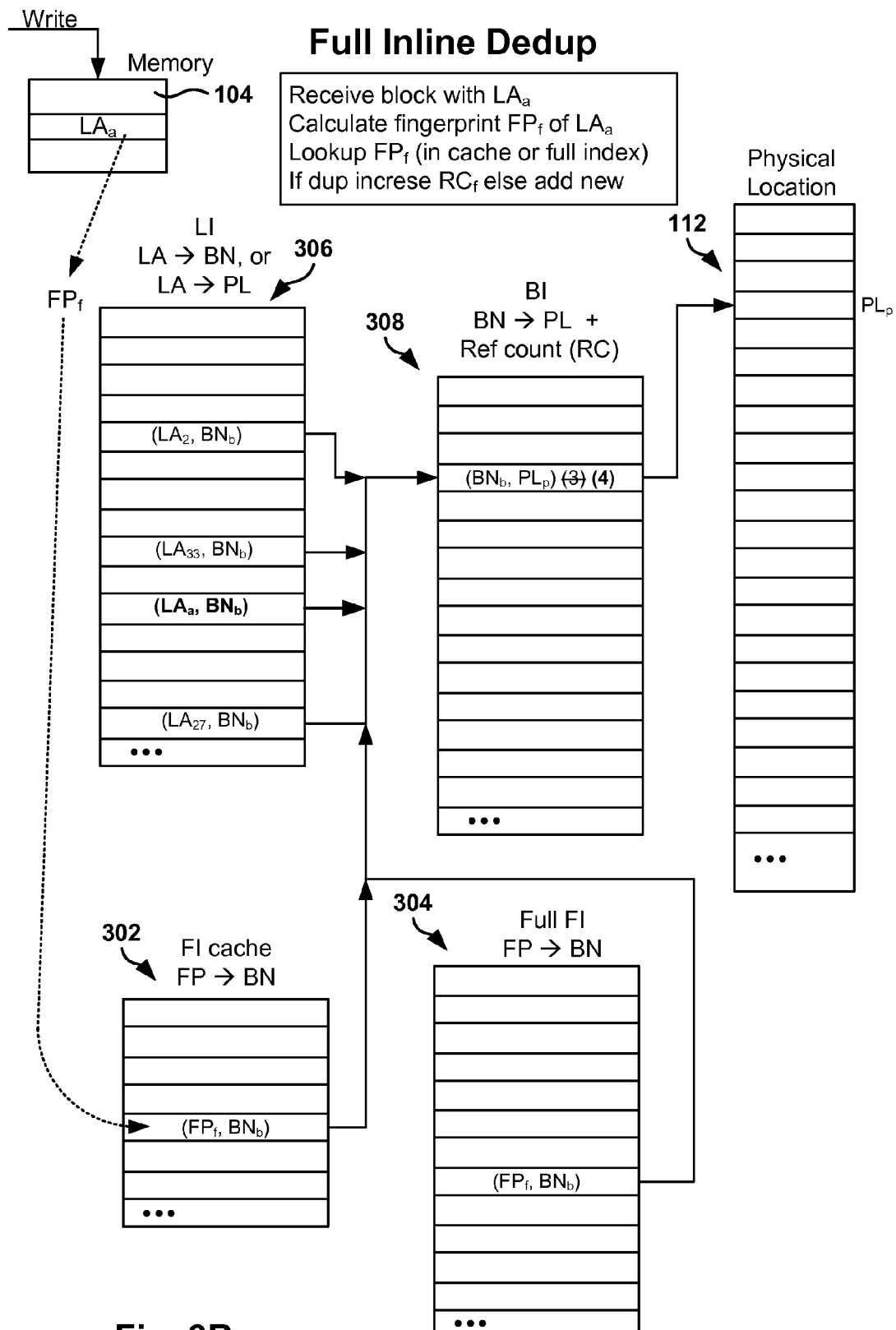
FIG. 3B illustrates inline deduplication, according to one embodiment.

FIG. 3B illustrates full inline deduplication, according to one embodiment. With inline deduplication, fingerprints are calculated as the data arrives at the storage system. FI is checked to see if the fingerprint is already in the index, and if the fingerprint already exists in the storage system, the block is not added to permanent storage. Instead, the incoming block is mapped to the already existing block with the same data.

Benefits of inline deduplication include requiring less storage because data is not duplicated, and calculating the fingerprint when the data is already in the fast memory used for receiving incoming blocks. On the negative side, fingerprint calculations may take a long time, impacting the performance of the incoming write requests.

In the exemplary embodiment of FIG. 3B, a block of data, having a logical address $LA_a$, is received and stored in memory 104, and fingerprint $FP_f$ is calculated for the block of data. The FI index is checked to see if there is an entry already in FI for fingerprint $FP_f$.

If there is no entry in FI for $FP_f$ (scenario not shown in FIG. 3B), then the block is added to physical storage PL, a block number is assigned to the new entry, and respective entries are added to the FI, LI, and BI indexes.

However, if fingerprint $FP_f$ is already indexed in FI (as shown in FIG. 3B), it means that there is a block $BN_b$ with the data already stored in the system due to the entry ($FP_f$, $BN_b$) in FI. A new entry is created in LI for $LA_a$ (or if the entry for $LA_a$ already exists then the entry is updated) mapping ($LA_a$, $BN_b$). Also, the corresponding reference count $BN_b$.RC is incremented in BI for the entry ($BN_b$, $PL_p$).

It is noted that the use of the fingerprint index is not a critical requirement for the system of FIG. 3B. For example, not all blocks need to be fingerprinted to be in the storage system, and fingerprinting may be turned off at times while still allowing the storage system to be operational. Of course, if fingerprinting is turned off, deduplicating will also stop, but the system will not stop if fingerprinting is temporarily shut down. In other solutions where the logical address is mapped to a fingerprint (LA, FP), fingerprinting cannot be turned off because fingerprinting is required to store new incoming blocks.

Another disadvantage of systems with (LA, FP) mappings is that locality is not preserved for data blocks that are written at the same time. Since each data block has its own fingerprint, which is usually completely different from the fingerprint of the next data block, then the entries in the (LA, FP) index will be completely scattered for the contiguous blocks. This is not the case for the embodiment shown in FIG. 3B, because contiguous blocks will have consecutive block numbers, thus allowing for preserving the locality of the blocks. For example, in a read operation, the storage system typically reads large chunks of data which may include several contiguous blocks. If a read operation requests four contiguous blocks, after reading the first block, the storage system will cache a large amount of data contiguous to the first block. When the second block is later read, the data for the second block will already be cached, making the read operation of the second block much faster.

Another benefit of not having the (LA, FP) index is a reduction in metadata overhead. For example, if the fingerprint is 32 bytes and the block number is 8 bytes, the (LA, BN) table will be much smaller than the (LA, FP) table. Further, it is noted that the FI index of FIG. 3B does not require that all blocks are fingerprinted.

One or more benefit of having the (LA, BN) mappings, is that there is one less critical point of failure in the system. If a system with the (LA, FP) mappings has a problem with fingerprints, the system will become nonoperational. However, if the FI index of FIG. 3B is for some reason corrupted, the FI index may be rebuilt without having to stop the system.

Another advantage of not having the (LA, FP) mapping is that deduplicating may become an opportunistic operation, because the system is able to turn on or off deduplicating. However, systems with the (LA, FP) mapping must always calculate the fingerprints for incoming blocks. Further yet, another advantage is that partial post-processing, as discussed in more detail below, is also enabled.

Figure 4:
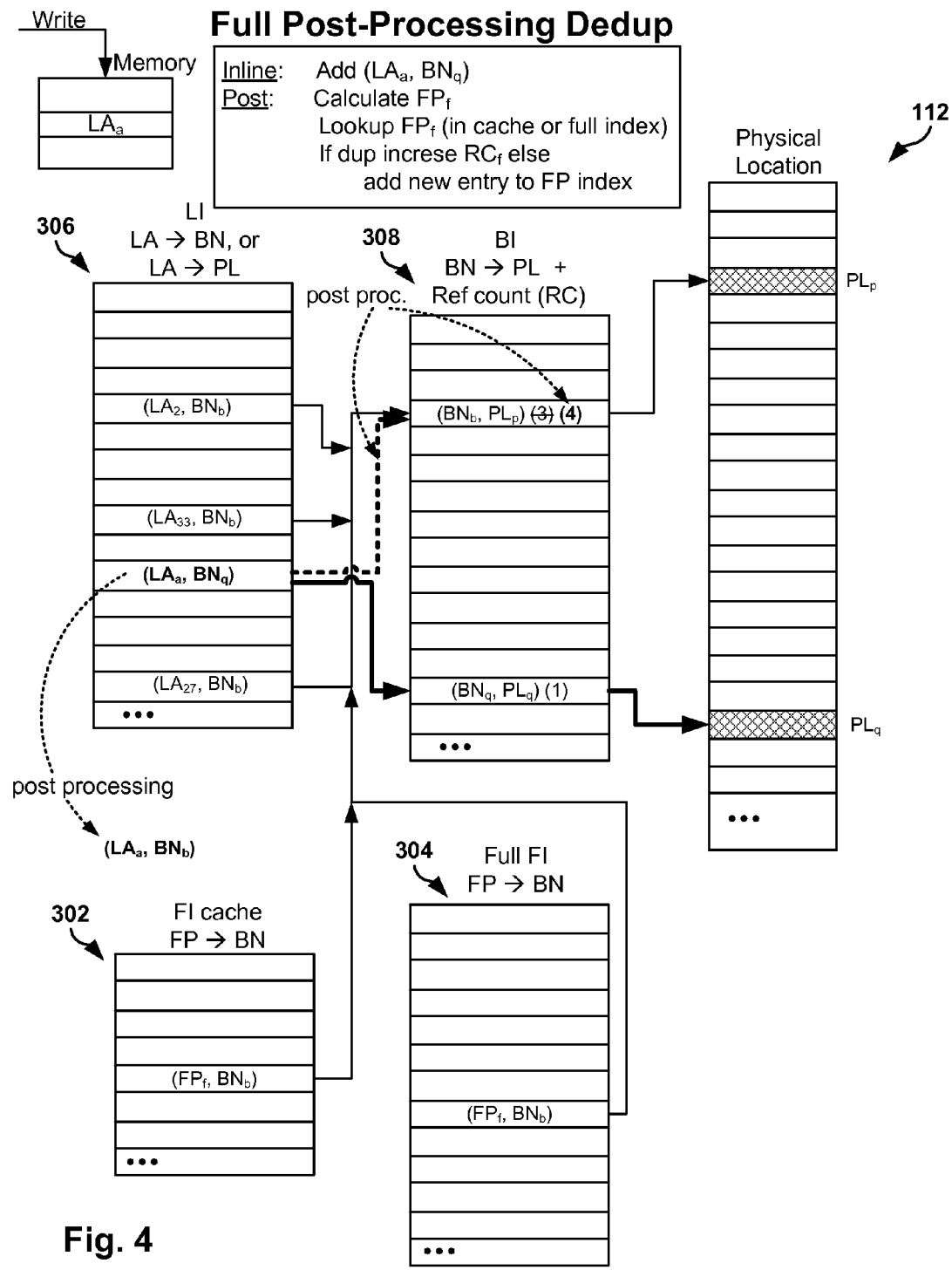
FIG. 4 illustrates post-processing deduplication, according to one embodiment.

FIG. 4 illustrates full post-processing deduplication, according to one embodiment. With post-processing deduplication, also referred to as postline deduplication or background deduplication, new data is first stored on the storage device and then a process at a later time performs deduplication on the data previously stored.

In the exemplary embodiment of FIG. 4, post-processing deduplication includes inline and post-processing operations. Inline operations refer to those operations that are performed when the data is received, and post-processing operations refer to operations performed after the incoming data has been saved in the storage system. The post-processing operations may be performed soon after in-line operations are completed, or much later, such as hours or days later. In general, post-processing operations assume that the data for the block is only stored in the physical location, although it may be possible that sometimes the data is still available in memory.

During inline processing, when a new block arrives with a logical address $LA_a$, the block is assigned a block number (e.g., $BN_q$), the block is stored in a physical location and assigned an address (e.g., $PL_q$). A corresponding entry is added ($LA_a$, $BN_q$) in the LI index, and an entry (BNq, PLq) is added to BI. In summary, the block is stored in $PL_q$, a new block number is assigned, and entries are created in LI and BI.

The post-processing part of deduplication includes calculating fingerprints of the data stored in memory, looking up the calculated fingerprints (in the full index or in the FI cache), and then consolidating the data (e.g., deduplicating) if duplicate blocks are found based on the calculated fingerprints.

In the exemplary embodiment of FIG. 4, a block with a logical address $LA_a$ is received, where the block is a duplicate of another block $BN_b$ already stored in $PL_p$.

During post-processing, the fingerprint $FP_f$ of the block stored in $PL_q$ is calculated. An existing entry ($FP_f$, $BN_b$) in FI mapping $FP_f$ to another block $BN_b$ is found, therefore, deduplicating is performed. The entry ($LA_a$, $PL_q$) in LI is changed to ($LA_a$, $BN_b$), the reference count $BN_b$.RC of $BN_b$ in BI is incremented, and $PL_q$ is freed for reuse.

Additionally, during post-processing, if an entry does not exist in FI for $FP_f$, then an entry for $FP_f$ is added in FI, a block number assigned, and an entry is created in BI for $FP_f$ and the assigned block number. Additionally, the entry in LI is also updated with the assigned block number.

In another embodiment, where the block and the BI entry are created during inline processing, then post-processing will calculate the fingerprints, as described above, and if duplicate blocks are found in BI, then the blocks are consolidated into a single entry by eliminating one and updating RC in the other one. The duplicated data in PL is also consolidated to keep only one entry in PL.

The benefit of post-processing is that there is no need to calculate fingerprints when the data is coming in, thereby, speeding up the processing of incoming data.

It is noted that the embodiments illustrated in FIGS. 1, 2A-2B, 3A-3B, and 4 are exemplary. Other embodiments may utilize different data structures, keep counters in different indexes, utilize reverse or dual pointers, etc. The embodiments illustrated in FIGS. 1, 2A-2B, 3A-3B, and 4 should therefore not be interpreted to be exclusive or limiting, but rather exemplary or illustrative.

FIG. 5 illustrates a partial post-processing deduplication method, according to one embodiment. In one embodiment, some of the deduplication operations are performed inline (e.g., at the time when the data arrives to the storage system) and other operations are performed post-processing (e.g., at a later time after the data has already been stored in the storage system). This method is referred to herein as partial post-processing deduplication, or partial inline deduplication.

Partial post-processing deduplication includes inline and post-processing operations. During inline processing, the fingerprint of the incoming data is calculated, but only the FI cache is accessed to check for a duplicated block already in the system. The full FI index is not accessed during inline processing, even if the data is not found in the FI cache. During post-processing, inconsistent mappings between FI cache and full FI are identified and consolidated, which includes reclaiming the memory for duplicate blocks.

In one embodiment, the inline processing of partial post-processing deduplication includes the following operations:

Calculate the fingerprint $FP_f$ of incoming data (e.g., data with logical address $LA_a$).

Look up the fingerprint $FP_f$ in FI cache to see if there is an entry for $FP_f$ (e.g., entry ($FP_f$, $BN_b$) mapping $FP_f$ to block $BN_b$).

If the entry ($FP_f$, $BN_b$) exists in FI, then a new entry ($LA_a$, $BN_b$) is added to LI to map the logical address $LA_a$ of the incoming data to the existing block $BN_b$ (or the entry is updated if there is already an entry for $LA_a$), and the corresponding reference counter $BN_b$.RC is increased in BI.

If there is no entry for $FP_f$ in FI, then the incoming data is stored in physical storage with an address of $PL_n$, a new block number $BN_m$ is assigned for $PL_n$, and the corresponding entry ($BN_m$, $PL_n$) is added to BI with an RC equal to 1. Additionally, a new entry ($LA_a$, $BN_m$) is added to LI, and a new entry ($FP_f$, $BN_m$) is added to FI.

As mentioned above, post-processing includes updating and correcting inconsistencies between full FI and FI cache. The inconsistencies may occur because during inline processing, the full FI is not checked, so an entry may be created for a block number in FI cache while there is already an entry in full FI for the same fingerprint, but associated with a different block. Therefore, post-processing corrects these inconsistencies by identifying the duplicates, updating the FI cache with the block number already in full FI, and freeing duplicate blocks.

In one embodiment, post-processing includes the following operations:

Check full FI and FI cache for respective entries with the same fingerprint and different block number, i.e., check all FI cache entries with fingerprint $FP_j$, and determine if there is an entry ($FP_j$, $BN_j$) in full FI and an entry ($FP_j$, $BN_k$) in FI cache, where $BN_j \neq BN_k$.

If a double entry is found for the same fingerprint, then entry ($FP_j$, $BN_k$) is replaced in FI cache with entry ($FP_j$, $BN_j$) using the block number from full FI. Additionally, the reference counter of $BN_j$ is updated by adding the RC for BNk, $BN_j.RC = BN_j.RC + BN_k.RC$. Further yet, pointers in LI that point to $BN_k$ are replaced with pointers to $BN_j$, and $BN_k$ and the corresponding block $PL_k$ are freed for garbage collection.

In another embodiment, the fingerprint FP is calculated during inline processing, but neither FI cache nor full FI are checked. Later, during post-processing, the fingerprints previously calculated are used for deduplication. The advantage of this approach is that the block of data does not have to be read from disk again to calculate the fingerprint, saving time as compared to pure post-processing.

One of the benefits of partial post-processing deduplication is that the system avoids checking the full FI index for incoming write requests. Since the full FI index may be large and stored in permanent storage (e.g., disk), checking the full FI may be a resource costly operation. By avoiding this costly operation, the processing of incoming requests is faster. At a later point in time, when system resources are not under pressure, the post-processing takes care of inconsistencies without affecting system performance.

In one embodiment, a method includes receiving, at a storage system, a data block having a logical address, the storage system including a logical address mapping index for mapping logical addresses to block numbers, a block index for mapping block numbers to physical locations, and a fingerprint index for mapping fingerprints of data blocks to block numbers; and inline processing the data block. The inline processing of the data block includes determining a fingerprint of the data block; examining the fingerprint index to determine if the fingerprint is already mapped to an existing data block in the storage system; if the fingerprint is already mapped then adding a mapping of the logical address to the existing data block in the logical address mapping index; and if the fingerprint is not already mapped then storing the data block in the storage system, adding a mapping of the logical address to the data block in the logical address mapping index, adding a mapping of the data block to the physical location in the block index, and adding a mapping of the fingerprint to the data block in the fingerprint index. The method further includes stopping inline processing, and while the inline processing is stopped, storing incoming data blocks in memory and omit calculating fingerprints of the incoming data blocks; and starting post-processing of data blocks. The post-processing includes calculating fingerprints of blocks without a fingerprint; and consolidating blocks stored in memory having the same fingerprint to deduplicate the data blocks with the same fingerprint.

In one embodiment, a storage system is disclosed and includes permanent storage; a memory for storing a logical address mapping index for mapping logical addresses to block numbers, a block index for mapping block numbers to physical locations, and a fingerprint index for mapping fingerprints of data blocks to block numbers; and a processor, wherein the processor is operable to receive a data block having a logical address, and the processor performs inline processing of the data block. The inline processing includes determining a fingerprint of the data block; examining the fingerprint index to determine if the fingerprint is already mapped to an existing data block in permanent storage; if the fingerprint is already mapped then adding a mapping of the logical address to the existing data block in the logical address mapping index; and if the fingerprint is not already mapped then storing the data block in the permanent storage, adding a mapping of the logical address to the data block in the logical address mapping index, adding a mapping of the data block to the physical location in the block index, and adding a mapping of the fingerprint to the data block in the fingerprint index. Further, the processor is operable to stop inline processing, and while the inline processing is stopped, store incoming data blocks in memory and omit calculating fingerprints of the incoming data blocks, and the processor is operable to start post-processing of data blocks. The post-processing includes calculating fingerprints of blocks without a fingerprint; and consolidating blocks stored in memory having the same fingerprint to deduplicate the data blocks with the same fingerprint.

In one embodiment, a non-transitory computer-readable storage medium storing a computer program is disclosed. The computer-readable storage medium includes program instructions for receiving, at a storage system, a data block having a logical address, the storage system including a logical address mapping index for mapping logical addresses to block numbers, a block index for mapping block numbers to physical locations, and a fingerprint index for mapping fingerprints of data blocks to block numbers; and program instructions for inline processing the data block. The program instructions for inline processing the data block includes determining a fingerprint of the data block; examining the fingerprint index to determine if the fingerprint is already mapped to an existing data block in the storage system; if the fingerprint is already mapped then adding a mapping of the logical address to the existing data block in the logical address mapping index; and if the fingerprint is not already mapped then storing the data block in the storage system, adding a mapping of the logical address to the data block in the logical address mapping index, adding a mapping of the data block to the physical location in the block index, and adding a mapping of the fingerprint to the data block in the fingerprint index. The computer-readable storage medium further includes program instructions for stopping inline processing, and while the inline processing is stopped, storing incoming data blocks in memory and omit calculating fingerprints of the incoming data blocks; and program instructions for starting post-processing of data blocks. The program instructions for post-processing further includes calculating fingerprints of blocks without a fingerprint; and consolidating blocks stored in memory having the same fingerprint to deduplicate the data blocks with the same fingerprint.

In one embodiment, the storage system may switch from inline deduplication, to post-processing deduplication, to partial post-processing deduplication, depending on user configuration, or user commands, or availability of resources in the system, or traffic congestion, etc. For example, the deduplication method may be changed by a system operator of a point in time, or may be set up by schedule, having different deduplication methods during the day or during the night. Further, the system may change deduplication methods based on the amount of congestion or traffic in the system.

The organization of the data in the system provides the flexibility to select one method for deduplication at any given time based on conditions. For example, inline may be the most efficient method (data does not have to be accessed again at a later time), but it requires higher consumption of system resources when the write occurs.

On the other hand, if the system is busy, post-processing deduplication may be the best approach, by postponing deduplication operations at a later time when the system has more available resources.

Partial post-processing deduplication may be appropriate during busy times, because it performs additional operations during inline processing, when compared to pure post-processing, but partial post-processing deduplication saves time for post-processing because the fingerprints are already calculated and the data does not have to be loaded in memory again.

One of the advantages of partial post-processing deduplication is that the system has a chance to add references to the same block inline, without having to look at the full index, which may be a costly operation. Another advantage is that the block of memory does not have to be read later during post-processing to calculate the fingerprint, because the fingerprint has already been calculated.

Figure 6A:
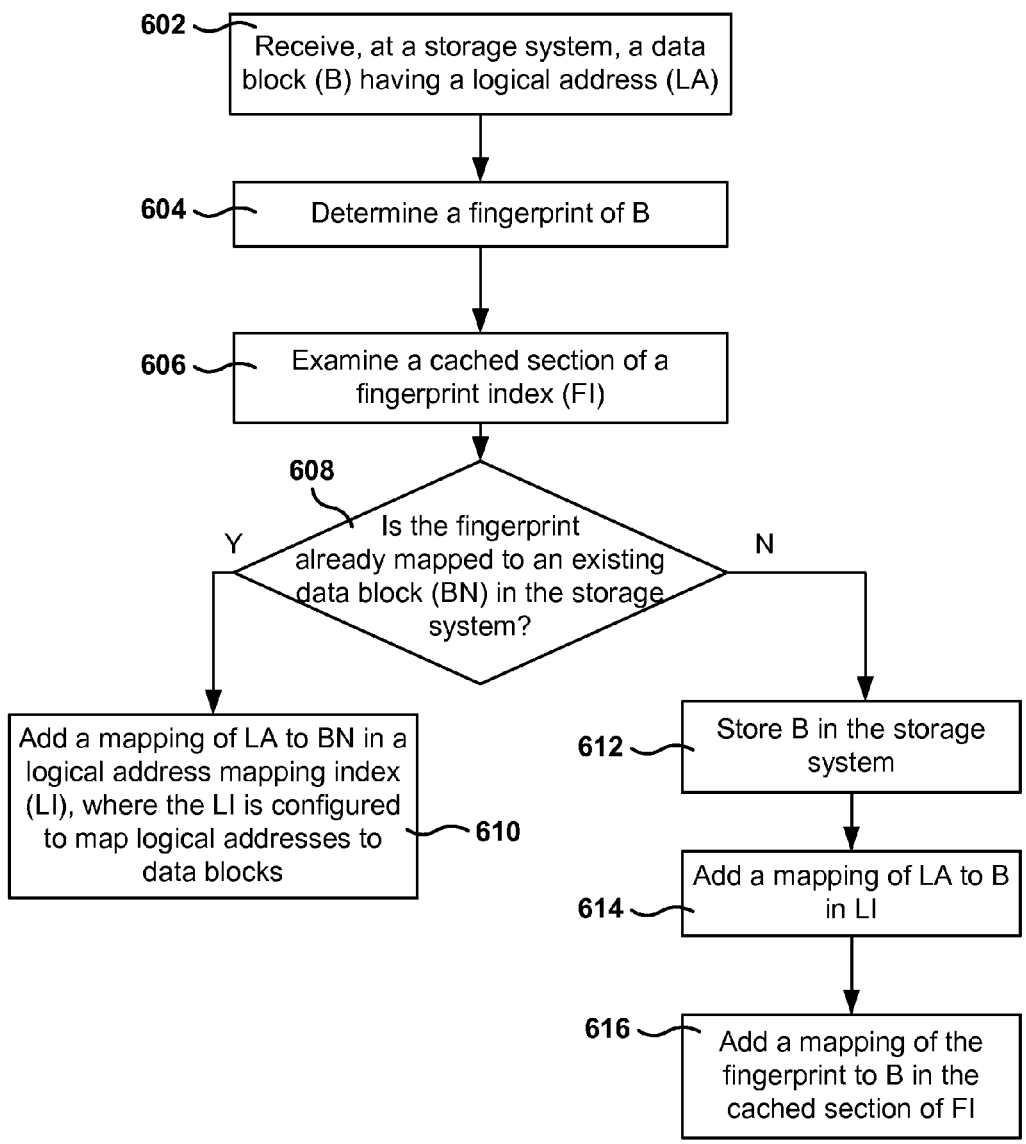
FIG. 6A is a flowchart of a method for inline deduplicating in a network storage device, according to one embodiment.

FIG. 6A is a flowchart of a method for inline deduplicating in a network storage device, according to one embodiment. While the various operations in this flowchart are presented and described sequentially, one of ordinary skill will appreciate that some or all of the operations may be executed in a different order, be combined or omitted, or be executed in parallel.

In operation 602, a data block (B) is received at a storage system, the data block B having a logical address (LA). From operation 602, the method flows to operation 604 to begin the inline processing operations. At a later point in time, post-processing deduplication is performed in the storage system.

In operation 604, a fingerprint of B is determined. From operation 604, the method flows to operation 606 to examine the cached section of the fingerprint index (FI). From operation 606, the method flows to operation 608, where a check is performed to determine if the fingerprint is already mapped to an existing data block (BN) in the storage system. If the fingerprint is already mapped, the method flows to operation 610, and if the fingerprint is not already mapped the method flows to operation 612.

In operation 610, a mapping of LA to BN is added in the logical address mapping index (LI), where LI is configured to map logical addresses to data blocks.

In operation 612, B is stored in the storage system, and in operation 614 a mapping of LA to B is added in LI. From operation 614, the method flows to operation 616 where a mapping of the fingerprint to B is added in the cached section of FI.

Figure 6B:
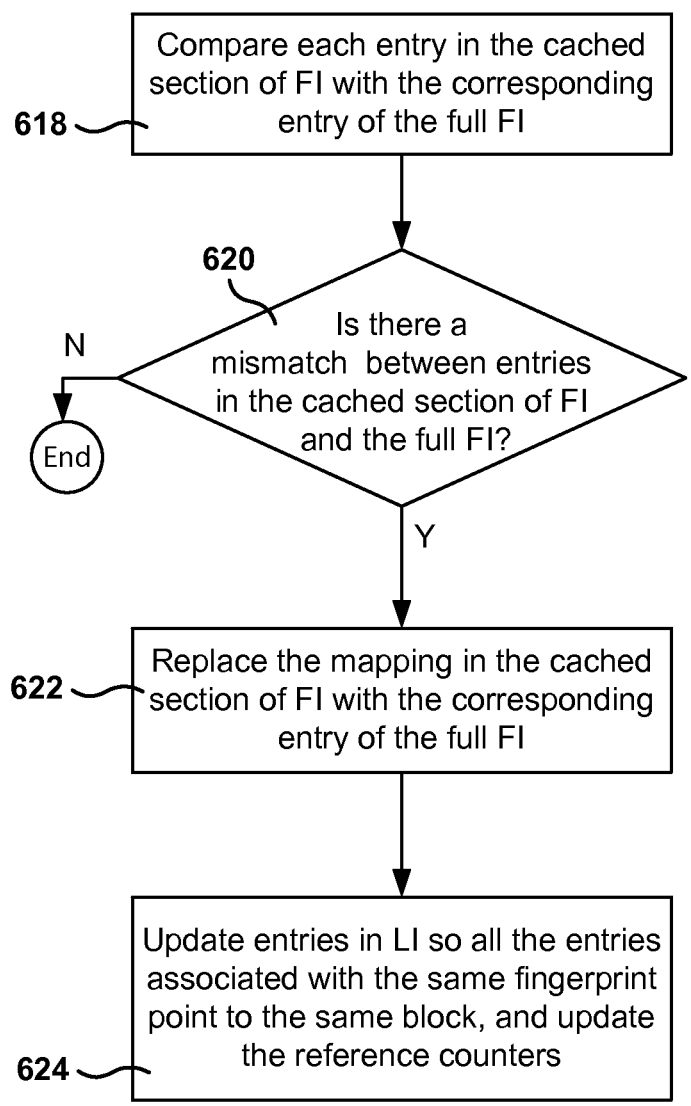
FIG. 6B is a flowchart of a method for post-processing deduplicating in a network storage device, according to one embodiment.

FIG. 6B is a flowchart of a method for post-processing deduplicating in a network storage device, according to one embodiment. During post-processing, entries in the cached section of FI are consolidated with the entries in the full FI. Post-processing begins in operation 618, where each entry in the cached section of FI is compared to the corresponding entry for the same fingerprint in the full FI.

From operation 618, the method flows to operation 620 where a check is made to determine if there is a mismatch between any of the entries in the cached section of FI with the corresponding entry in the full FI for the same fingerprint.

If at least one mismatch is found, the method flows to operation 622, otherwise the post-processing ends. In operation 622, the mapping in the cached section of FI is replaced with a corresponding entry from the full FI, therefore, the mapping in the cached section of FI now points to the same block as the corresponding entry of FI.

From operation 622, the method flows to operation 624, where entries in LI are updated so all the entries associated with the same fingerprint point to the same block, and the reference counters are updated.

Figure 7A:
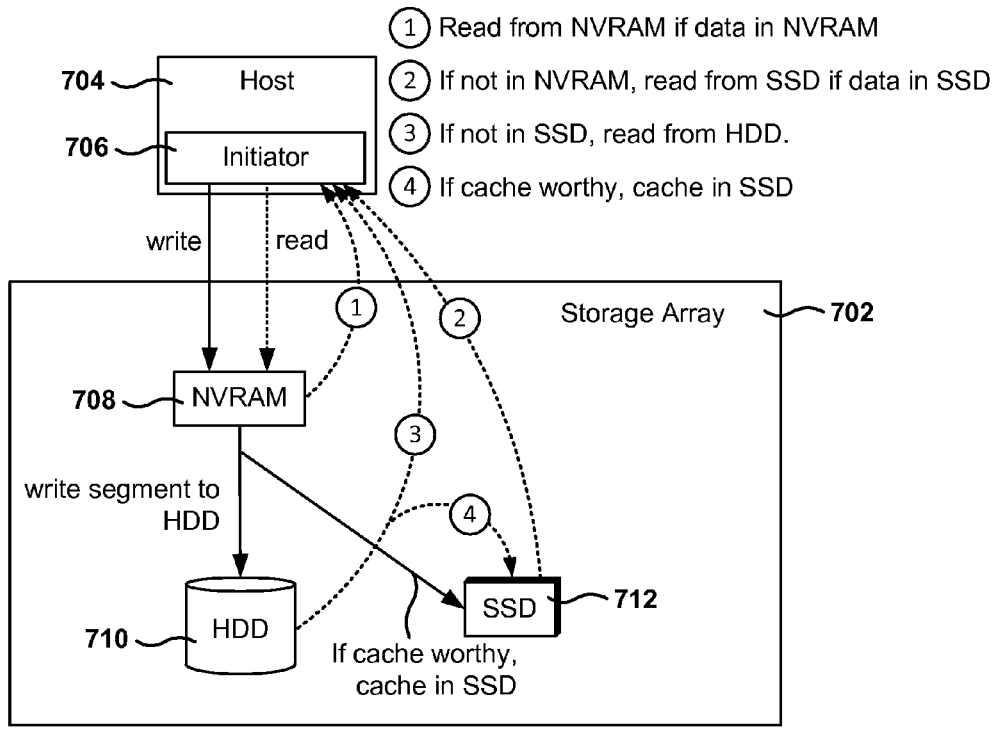
FIGS. 7A-7B illustrate the read and write paths within the storage array, according to several embodiments.
Figure 7B:
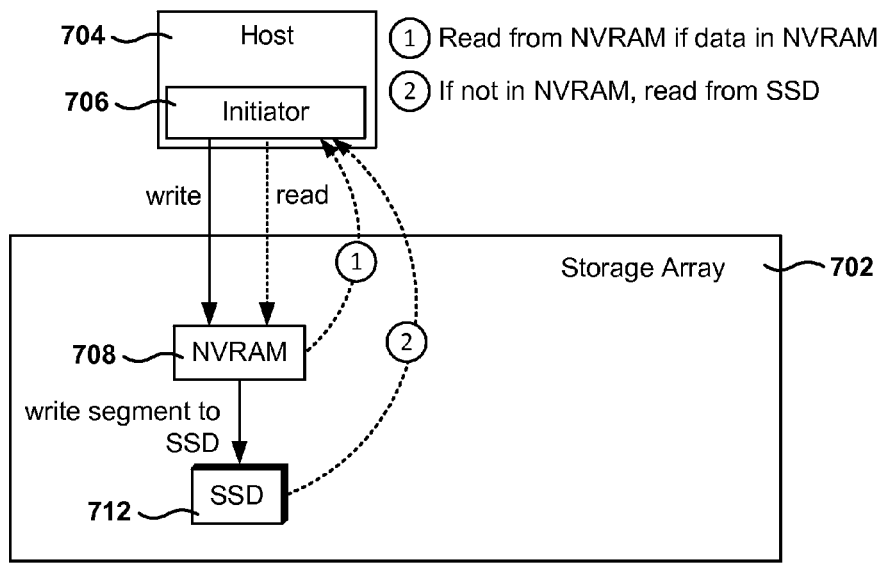

FIGS. 7A-7B illustrate the read and write paths within the storage array, according to several embodiments. FIG. 7A shows the write path for a hybrid system with SSDs and HDDs, where the initiator 706 in the host 704 sends the write request to the storage array 702. As the write data comes in, the write data is written into NVRAM 708, and an acknowledgment is sent back to the initiator (e.g., the host or application making the request). In one embodiment, storage array 702 supports variable block sizes. Data blocks in the NVRAM 708 are grouped together to form a segment that includes a plurality of data blocks, which may be of different sizes. The segment is compressed and then written to HDD 710. In addition, if the segment is considered to be cacheworthy (i.e., important enough to be cached or likely to be accessed again) the segment is also written to the solid state drive (SSD) cache 712. In one embodiment, the segment is written to the SSD 712 in parallel while writing the segment to HDD 710.

In one embodiment, the performance of the write path is driven by the flushing of NVRAM 708 to disk 710. With regards to the read path, the initiator 706 sends a read request to storage array 702. The requested data may be found in any of the different levels of storage mediums of the storage array 702. First, a check is made to see if the data is found in RAM (not shown), which is a shadow memory of NVRAM 708, and if the data is found in RAM then the data is read from RAM and sent back to the initiator 706. In one embodiment, the shadow RAM memory (e.g., DRAM) keeps a copy of the data in the NVRAM and the read operations are served from the shadow RAM memory. When data is written to the NVRAM, the data is also written to the shadow RAM so the read operations can be served from the shadow RAM leaving the NVRAM free for processing write operations.

If the data is not found in the shadow RAM then a check is made to determine if the data is in cache, and if so (i.e., cache hit), the data is read from the flash cache 712 and sent to the initiator 706. If the data is not found in the NVRAM 708 nor in the flash cache 712, then the data is read from the hard drives 710 and sent to the initiator 706. In addition, if the data being served from hard disk 710 is cache worthy, then the data is also cached in the SSD cache 712.

FIG. 7B illustrates the read and write paths for an all-flash array having SSDs for permanent storage and no HDDs. The write path includes writing the incoming data to NVRAM 708 and later saving the data in SSD 712. The read path is also simplified as compared to the hybrid system of FIG. 7A, where the data is read from NVRAM 708 if available in NVRAM, and if the data is not found in NVRAM 708 then the data is read from SSD 712.

Figure 8:
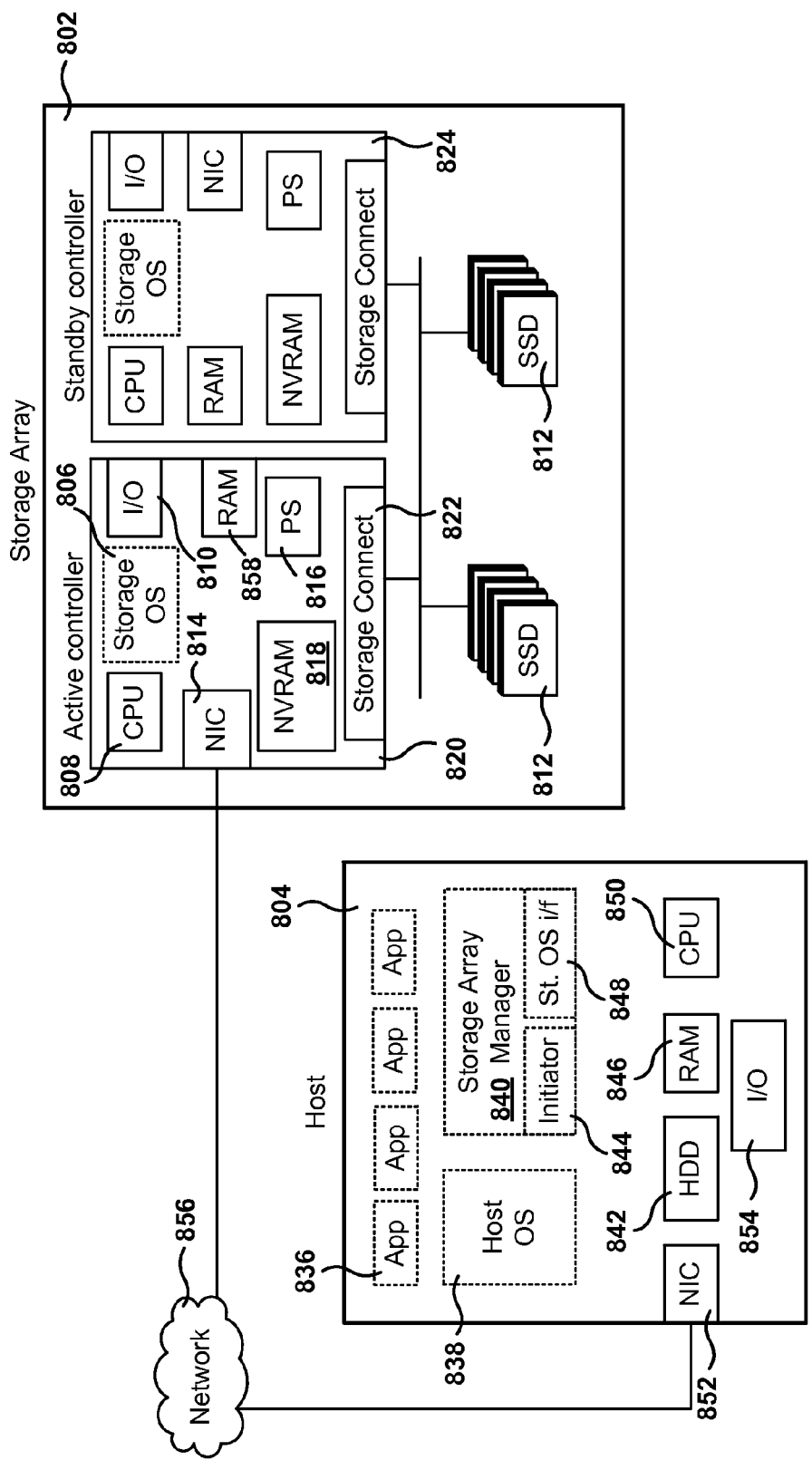
FIG. 8 illustrates the architecture of an all-flash storage array, according to one embodiment.

FIG. 8 illustrates the architecture of an all-flash storage array, according to one embodiment. In one embodiment, all-flash storage array 802 includes an active controller 820, a standby controller 824, and one or more SSDs 812. In one embodiment, the controller 820 includes non-volatile RAM (NVRAM) 818, which is for storing the incoming data as the data arrives to the storage array. After the data is processed (e.g., compressed and organized in segments (e.g., coalesced)), the data is transferred from the NVRAM 818 to SSD 812.

In addition, the active controller 820 further includes CPU 808, general-purpose RAM 812 (e.g., used by the programs executing in CPU 808), input/output module 810 for communicating with external devices (e.g., USB port, terminal port, connectors, plugs, links, etc.), one or more network interface cards (NICs) 814 for exchanging data packages through network 856, one or more power supplies 816, a temperature sensor (not shown), and a storage connect module 822 for sending and receiving data to and from SSD 812. In one embodiment, standby controller 824 includes the same components as active controller 820.

Active controller 820 is configured to execute one or more computer programs stored in RAM 858. One of the computer programs is the storage operating system (OS) used to perform operating system functions for the active controller device. In some implementations, one or more expansion shelves 830 may be coupled to storage array 802 to increase storage capacity.

Active controller 820 and standby controller 824 have their own NVRAMs, but they share SSDs 812. The standby controller 824 receives copies of what gets stored in the NVRAM 818 of the active controller 820 and stores the copies in its own NVRAM. If the active controller 820 fails, standby controller 824 takes over the management of the storage array 802. When servers, also referred to herein as hosts, connect to the storage array 802, read/write requests (e.g., IO requests) are sent over network 856, and the storage array 802 stores the sent data or sends back the requested data to host 804.

Host 804 is a computing device including a CPU 850, memory (RAM) 846, permanent storage (HDD) 842, a NIC card 852, and an IO module 854. The host 804 includes one or more applications 836 executing on CPU 850, a host operating system 838, and a computer program storage array manager 840 that provides an interface for accessing storage array 802 to applications 836. Storage array manager 840 includes an initiator 844 and a storage OS interface program 848. When an IO operation is requested by one of the applications 836, the initiator 844 establishes a connection with storage array 802 in one of the supported formats (e.g., iSCSI, Fibre Channel, or any other protocol). The storage OS interface 848 provides console capabilities for managing the storage array 802 by communicating with the active controller 820 and the storage OS 806 executing therein.

To process the IO requests, resources from the storage array 802 are required. Some of these resources may be a bottleneck in the processing of storage requests because the resources are over utilized, or are slow, or for any other reason. In general, the CPU and the hard drives of the storage array 802 can become over utilized and become performance bottlenecks. For example, the CPU may become very busy because the CPU is utilized for processing storage IO requests while also performing background tasks, such as garbage collection, snapshots, replication, alert reporting, etc. In one example, if there are many cache hits (i.e., the SSD contains the requested data during IO requests), the SSD cache, which is a fast responding system, may press the CPU for cycles, thus causing potential bottlenecks for other requested IOs or for processing background operations.

For purposes of discussion and understanding, reference is made to CASL as being an algorithm processed by the storage OS. However, it should be understood that optimizations, modifications, additions, and subtractions to versions of CASL may take place from time to time. As such, reference to CASL should be understood to represent exemplary functionality, and the functionality may change from time to time, and may be modified to include or exclude features referenced herein or incorporated by reference herein. Still further, it should be understood that the embodiments described herein are just examples, and many more examples and/or implementations may be defined by combining elements and/or omitting elements described with reference to the claimed features.

In one embodiment, it should be understood that the "block level processing" of SSDs 812 is different than "instruction level processing," which is a common function in microprocessor environments. In one example, microprocessor environments utilize main memory, and various levels of cache memory (e.g., L1, L2, etc.). Instruction level caching, is differentiated further, because instruction level caching is block-agnostic, meaning that instruction level caching is not aware of what type of application is producing or requesting the data processed by the microprocessor. Generally speaking, the microprocessor is required to treat all instruction level caching equally, without discriminating or differentiating processing of different types of applications.

Figure 9:
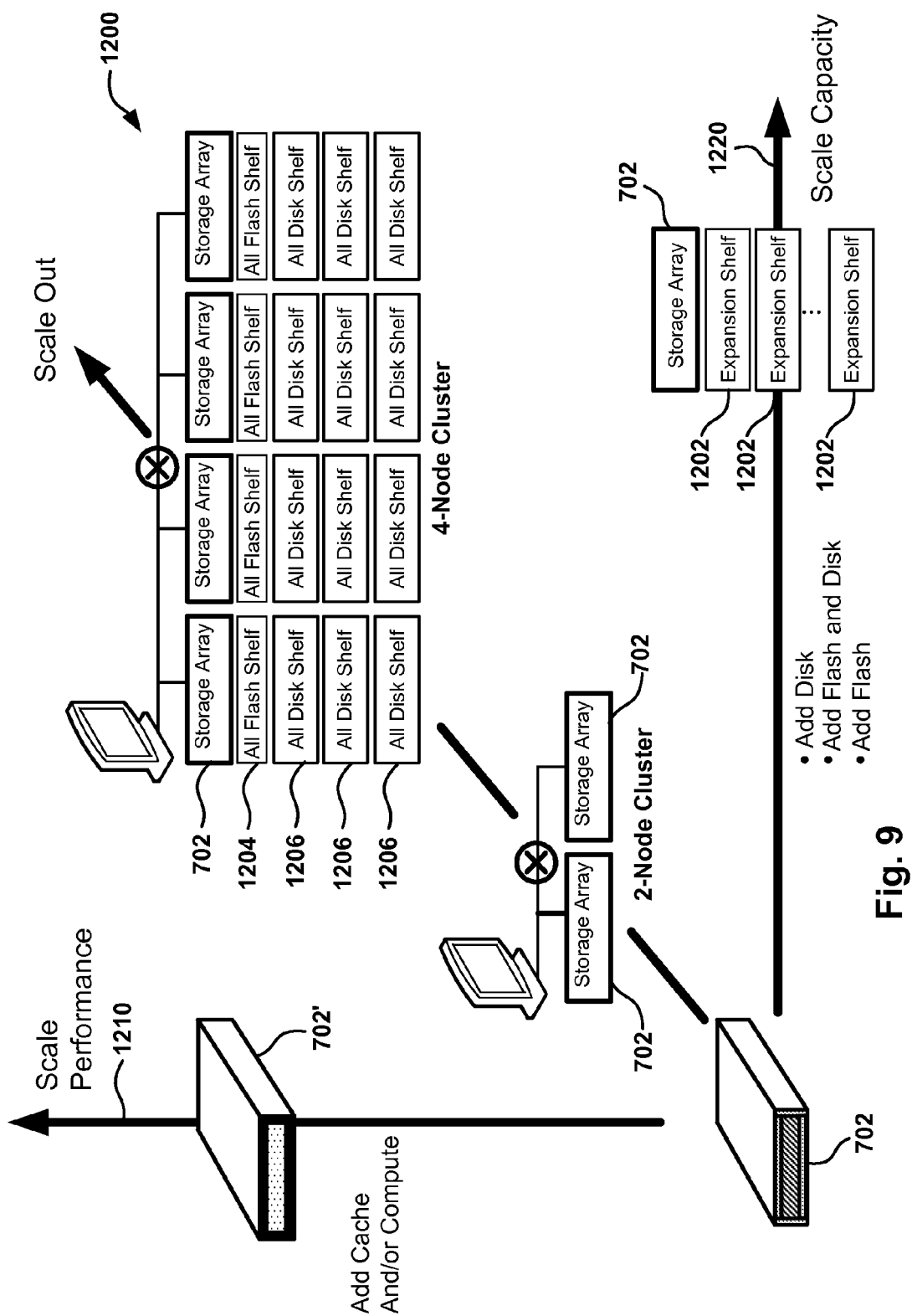
FIG. 9 is an example of the flexibility of the storage array, which can be expanded for scaling performance and for scaling capacity.

FIG. 9 is an example of the flexibility of the storage array, which can be expanded for scaling performance and for scaling capacity. In this illustration, the storage array can be adjusted to add cache and/or compute resources to define a more powerful storage array 702'. In one example, instead of upgrading the storage array 702, an upgraded storage array 702 can take its place to provide additional processing power (e.g., more powerful CPUs, higher capacity NVRAM, higher capacity DRAM, improved storage enclosure routing and buses, improved fan speeds, modified enclosure (e.g., chassis) heights (U1, U2, U3, etc.), different power supplies, and/or other redundancy and/or memory and/or processing infrastructure.

In one embodiment, if the storage array requires additional disk or storage or flash storage memory, the storage array can be expanded to scale out by adding expansion shelves 1202 to the storage array 702. As discussed above, the expansion shelves 1202 may be defined by all-disk shelves (ADS) or all-flash shelves (AFS), or combinations of ADS and AFS shelves In a further example, the flexibility of the storage array 702 is shown by its ability to be clustered into various sizes, which take into consideration both the scaling of performance and the scaling of capacity, which is referred to herein as "scaling-out" or "scale-out" of the storage array implementation. As shown, if additional processing power is required and additional storage capacity is required, storage arrays can be clustered together, such as to define a two-node cluster. In other embodiments, if an increased level of storage is required and processing power, multiple storage arrays can be clustered together, such as in the example of a four-node cluster.

The four-node cluster is provided such that each storage array is expanded by an all flash shelf 1204 and various all-disk shelves 1206. In some embodiments, fewer all-disk shelves can be coupled to each of the arrays that are clustered together. In still other embodiments, some clustered arrays may not be included in all flash shelves but only additional one or more of all-disk shelves. Still further, some embodiments may be more symmetric such as the four-node cluster example shown in FIG. 9.

Thus, the embodiments described herein enable the scaling of capacity and performance beyond the physical limitations of a single storage array by seamlessly clustering any combination of storage hybrid arrays. An advantage of clustering is that performance can be managed to avoid capacity silos and performance hotspots, and enables easy management of all hardware resources across the cluster as a single storage entity.

In one embodiment, as mentioned above, the storage OS that executes a storage algorithm is capable of taking thousands of point-in-time instant snapshots of volumes by creating a copy of the volumes' indices. Any updates to existing data or new data written to a volume are redirected to free space. In one example implementation, no performance impact due to snapshot processing is taken, as snapshots take little incremental space when only changes are maintained. This also simplifies restoring snapshots, as no data needs to be copied.

Other embodiments are also provided, wherein some or all of the snapshots can be entirely and uniquely taken, wherein no incremental type snapshot is processed. Thus, it should be understood that a variety of implementations and modifications can be made and still enable the snapshot management to be processed by the storage OS of the storage array 702, in accordance with one or more embodiments. In another embodiment, processing by the storage OS enables efficient replication of data to another array by transferring compressed, block-level changes only. These remote copies can be made active if the primary array becomes unavailable. This makes deploying disaster data recovery easy and affordable—especially over a WAN to a remote array where bandwidth is limited.

One or more embodiments can also be fabricated as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments.

What is claimed is:

1. A method comprising:
receiving, at a storage system, a data block having a logical address, the storage system including a logical address mapping index for mapping logical addresses to block numbers, a block index for mapping block numbers to physical locations in the storage system, and a fingerprint index for mapping fingerprints of data blocks to block numbers;
inline processing at least the data block, wherein inline processing the data block includes:
determining a fingerprint of the data block;
in response to a determination that the fingerprint of the data block is already mapped to an existing block number, adding a mapping of the logical address to the existing data block in the logical address mapping index; and
in response to a determination that the fingerprint of the data block is not already mapped to an existing block number, storing the data block in a physical location in the storage system, and adding respective mappings for the data block to each of the logical address mapping index, the block index, and the fingerprint index;
subsequent to the inline processing of the data block and based on at least one system condition, the storage system switching from the inline processing to post-processing deduplication, wherein the switching includes stopping the inline processing;
while the inline processing is stopped, storing incoming data blocks in physical locations in the storage system without calculating fingerprints of the incoming data blocks; and
performing post-processing of the data blocks that were stored in physical locations in the storage system without fingerprints being calculated, including:
calculating fingerprints of the data blocks that were stored in physical locations in the storage system without fingerprints being calculated; and
consolidating data blocks stored in physical locations in the storage system having a same fingerprint to deduplicate the data blocks having the same fingerprint.

2. The method as recited in claim 1, wherein consolidating the data blocks stored in the memory includes:
for a first data block stored in the memory, determining whether there is already a second data block having a same fingerprint as the first data block in the fingerprint index; and
in response to a second data block having the same fingerprint as the first data block being in the fingerprint index, deduplicating the first data block.

3. The method as recited in claim 2, wherein deduplicating the first data block includes:
replacing, in the logical address index, a mapping of a logical address of the first data block to point to the second data block;
increasing, in the block index, a reference count for an entry of the second data block;
deleting, in the block index, an entry for the first data block; and
garbage collecting a physical location where the first data block was stored.

4. The method as recited in claim 3, wherein the reference count indicates how many logical addresses share a same data block.

5. The method as recited in claim 1, wherein performing the partial post-processing further includes:
determining whether a fingerprint of an incoming data block is in a cached subset of the fingerprint index;
in response to the fingerprint of the incoming data block being in the cached subset of the fingerprint index, deduplicating the incoming data block; and
in response to the fingerprint of the incoming data block not being in the cached subset of the fingerprint index, adding an entry in the cached subset of the fingerprint index for the incoming data block.

6. The method as recited in claim 1, wherein determining the fingerprint of the data block includes:
executing a fingerprinting algorithm to map contents of the data block to a bit string of a predetermined length.

7. The method as recited in claim 1, wherein the at least one system condition comprises at least one of availability of at least one resource in the storage system, or an amount of traffic in the storage system.

8. The method as recited in claim 1, wherein performing post-processing of the data blocks further comprises looking up the calculated fingerprints in at least one of a full version of the fingerprint index or a cached subset of the fingerprint index.

9. A storage system comprising:
a storage;
a processor;
a memory storing a logical address mapping index for mapping logical addresses to block numbers, a block index for mapping block numbers to physical locations in the storage system, and a fingerprint index for mapping fingerprints of data blocks to block numbers; and
a computer-readable storage medium storing instructions that, when executed by the processor, cause the processor to perform inline processing of at least a data block received by the storage system and having a logical address, including instructions to cause the processor to:
determine a fingerprint of the data block;
in response to a determination that the fingerprint of the data block is already mapped to an existing block number, add a mapping of the logical address to the existing data block in the logical address mapping index; and
in response to a determination that the fingerprint of the data block is not already mapped to an existing block number, store the data block in a physical location in the storage system, and add respective mappings for the data block to each of the logical address mapping index, the block index, and the fingerprint index;
the instructions, when executed by the processor, are further to cause the processor of the storage system to switch from the inline processing to post-processing deduplication, subsequent to the inline processing of the data block, wherein the switch includes stopping the inline processing;
the instructions, when executed by the processor, are further to cause the processor of the storage system to store incoming data blocks in the memory without calculating fingerprints of the incoming data blocks while the inline processing is stopped; and
the instructions, when executed by the processor, are further to cause the processor of the storage system to perform post-processing of the data blocks that were stored in physical locations in the storage system, including:
calculation of fingerprints of the data blocks that were stored in the memory physical locations in the storage system without fingerprints being calculated; and
consolidation of data blocks stored in physical locations in the storage system having a same fingerprint to deduplicate the data blocks having the same fingerprint.

10. The storage system as recited in claim 9, wherein to consolidate the incoming data blocks stored in the memory, the processor is to:
for a first data block stored in the memory, determine whether there is already a second data block having a same fingerprint as the first block in the fingerprint index; and
in response to a second data block having the same fingerprint as the first block being in the fingerprint index, deduplicate the first data block.

11. The storage system as recited in claim 10, wherein to deduplicate the first data block, the processor is to:

replace, in the logical address index, a mapping of a logical address of the first data block to point to the second data block;
increase, in the block index, a reference count for an entry of the second data block;
delete, in the block index, an entry for the first data block; and
garbage collect a physical location where the first data block was stored.

12. The storage system as recited in claim 9, wherein the at least one system condition comprises at least one of availability of at least one resource in the storage system, or an amount of traffic in the storage system.

13. The storage system as recited in claim 9, wherein to perform post-processing of the data blocks, the processor is further to look up the calculated fingerprints in at least one of a full version of the fingerprint index or a cached subset of the fingerprint index.

14. The storage system as recited in claim 9, wherein to perform the partial post-processing, the processor is further to:
determine whether a fingerprint of an incoming data block is in a cached subset of the fingerprint index;
in response to the fingerprint of the incoming data block being in the cached subset of the fingerprint index, deduplicate the incoming data block; and
in response to the fingerprint of the incoming data block not being in the cached subset of the fingerprint index, add an entry in the cached subset of the fingerprint index for the incoming data block.

15. A non-transitory computer-readable storage medium storing a computer program that, when executed by a processor of a storage system, cause the processor to:
receive, at a storage system, a data block having a logical address, the storage system including a logical address mapping index for mapping logical addresses to block numbers, a block index for mapping block numbers to physical locations in the storage system, and a fingerprint index for mapping fingerprints of data blocks to block numbers;
perform inline processing of at least the data block, including:
determine a fingerprint of the data block;
in response to a determination that the fingerprint of the data block is already mapped to an existing block number, add a mapping of the logical address of the data block to the existing block number in the logical address mapping index; and
in response to a determination that the fingerprint of the data block is not already mapped to an existing block number, store the data block in a physical location in the storage system, and add respective mappings for the data block to each of the logical address mapping index, the block index, and the fingerprint index;
switch, based on at least one system condition, from the inline processing to post-processing deduplication, wherein the switch is subsequent to the inline processing of the data block and includes stopping the inline processing;
while the inline processing is stopped, store incoming data blocks in physical locations in the storage system without calculating fingerprints of the incoming data blocks; and
perform post-processing of the data blocks that were stored in physical locations in the storage system without fingerprints being calculated, including:

calculation of fingerprints of the data blocks that were stored in physical locations in the storage system without fingerprints being calculated; and consolidation of data blocks stored in physical locations in the storage system having a same fingerprint to deduplicate the data blocks having the same fingerprint.

16. The non-transitory computer-readable storage medium as recited in claim 15, wherein to consolidate the incoming data blocks stored in the memory, the computer program is to cause the processor to:

for a first data block in the memory, determine whether there is already a second data block having a same fingerprint as the first data block in the fingerprint index; and in response to a second data block having the same fingerprint as the first data block being in the fingerprint index, deduplicate the first data block.

17. The non-transitory computer-readable storage medium as recited in claim 16, wherein to deduplicate the first data block, the computer program is to cause the processor to:

replace, in the logical address index, a mapping of a logical address of the first data block to point to the second data block;

increase, in the block index, a reference count for an entry of the second data block;

delete, in the block index, an entry for the first data block; and garbage collect a physical location where the first data block was stored.

18. The non-transitory computer-readable storage medium as recited in claim 15, wherein to perform the partial post-processing, the computer program is to cause the processor to:

determine whether a fingerprint of an incoming data block is in a cached subset of the fingerprint index;

in response to the fingerprint of the incoming data block being in the cached subset of the fingerprint index, deduplicate the incoming data block; and in response to the fingerprint of the incoming data block not being in the cached subset of the fingerprint index, add an entry in the cached subset of the fingerprint index for the incoming data block.

19. The non-transitory computer-readable storage medium as recited in claim 15, wherein the at least one system condition comprises at least one of availability of at least one resource in the storage system, or an amount of traffic in the storage system.

20. The non-transitory computer-readable storage medium as recited in claim 15, wherein to perform post-processing of the data blocks, the computer program is further to cause the processor to look up the calculated fingerprints in at least one of a full version of the fingerprint index or a cached subset of the fingerprint index.

* * * * *